(12) United States Patent
Mischenko et al.

(10) Patent No.: US 6,301,361 B1
(45) Date of Patent: Oct. 9, 2001

(54) ENCODING AND DECODING INFORMATION USING RANDOMIZATION WITH AN ALPHABET OF HIGH DIMENSIONALITY

(76) Inventors: Valentin Alexandrovich Mischenko, 28-210, Nekrasova Street, Minsk 220040; Uladzimir Uladzimirovich Zakharau, 1-2-22, 50 Let Pobedy Street, Minsk 220056, both of (BY)

( * ) Notice: Subject to any disclaimer, the term of this patent is extended or adjusted under 35 U.S.C. 154(b) by 0 days.

(21) Appl. No.: 09/271,222

(22) Filed: Mar. 17, 1999

(51) Int. Cl.[7] ..................................................... H04K 1/00

(52) U.S. Cl. ............................... 380/28; 380/42; 380/43; 380/44; 380/46; 380/47

(58) Field of Search ................................. 380/42, 43, 44, 380/46, 47, 28

(56) References Cited

U.S. PATENT DOCUMENTS

| | | | |
|---|---|---|---|
| 3,967,067 | * 6/1976 | Potter | 179/1.5 R |
| 4,850,019 | * 7/1989 | Shimizu et al. | 380/29 |
| 5,161,244 | * 11/1992 | Maurer | 380/43 |
| 5,222,142 | * 6/1993 | Kent | 380/46 |
| 5,297,207 | * 3/1994 | Degele | 380/46 |
| 5,440,640 | * 8/1995 | Anshel et al. | 380/46 |
| 5,619,576 | * 4/1997 | Shaw | 380/44 |
| 5,835,597 | * 11/1998 | Coppersmith et al. | 380/28 |
| 6,078,665 | * 6/2000 | Andersen et al. | 380/28 |

OTHER PUBLICATIONS

Applied Cryptography, Second Edition (Schneier, 1995, pp. 15–17, 227–228, and 265–301).*
Cryptography: Theory and Practice (Stinson, 1956, pp. 44–51).*
Claims 1–3, Belarus Patent Applications No. 960,296, Published on Dec. 30, 1997, by Belorussian Patent Office.

* cited by examiner

*Primary Examiner*—Albert Decady
*Assistant Examiner*—Paul E. Callahan
(74) *Attorney, Agent, or Firm*—David Newman Chartered

(57) ABSTRACT

A method for encoding a set of initial symbols from a plurality of elemental symbols. The method generates for each symbol from the set of initial symbols, a first parameter representing a number of intervals of a numeric axis, a plurality of second parameters representing a plurality of lengths of intervals of the numeric axis, and a plurality of third parameters representing a plurality of locations, respectively. The method generates for each symbol from the first plurality of parameters, from the second plurality of parameters, and from the third plurality of parameters, a key function for each symbol, respectively. The method transforms for each symbol using the respective key function, the set of initial symbols to a plurality of individual symbols, respectively. Using the plurality of key symbols as a key, the method encodes the set of initial symbols as a set of encoded symbols, respectively. The symbol unit optionally may generate with a supplemental function, for each symbol, a supplemental symbol, and combine a supplemental symbol with a respective individual symbol to generate a key symbol. The encryptor, using the plurality of key symbols as a key, encodes the set of initial symbols as an set of encoded symbols, respectively.

18 Claims, 10 Drawing Sheets

ENCODING AND DECODING INFORMATION USING RANDOMIZATION WITH AN ALPHABET OF HIGH DIMENSIONALITY

RELATED PATENTS

This patent application is related to PCT International patent application No. PCT/BY99/00004, filed Mar. 16, 1999, entitled METHOD AND APPARATUS FOR ENCODING AND DECODING INFORMATION, by inventors Valentin Alexandrovich Mischenko and Uladzimirovich Zakharau, and prior Belorussian patent application no. 960,296, filed Jun. 12, 1996, entitled METHOD AND APPARATUS FOR ENCODING AND TRANSFERRING INFORMATION, by inventors Valentin Alexandrovich Mischenko and Uladzimirovich Zakharau. Claims 1 and 3 of Belorussian patent application no. 960,296 were published by the Belorussian Patent Office on Dec. 30, 1997. The specification and drawings of Belorussian patent application no. 960,296 are not published as of the U.S. Patent application filed concurrently herewith.

BACKGROUND OF THE INVENTION

This invention relates to encryption, and more particularly to protecting information from unauthorized access, and may be used in crypt-systems for encoding, transferring or storing, and decoding of communications or data as well as in others systems for protecting information.

DESCRIPTION OF THE RELEVANT ART

The prior art describes technical solutions which provide protection of transferred information by using a special device or encoding software. Victor Garish "Practical Guide on Protecting Commercial Secrets". Simferopol, TAVRIDA, 1994, p.35–37, FIG. 22, describes a scrambler for protecting telephone conversations. The scrambler operates on the principal of inverting an audio signal. Ordinary speech is changed into a nonsensical set of sounds, but the initial signal is received without any distortion. The scrambler includes a coder for changing voice. The coder is filled with 13,122 user's codes, which provide 52,488 digital combinations. The scrambler has resident software, which encodes and decodes the transferred information in several variants and controls the operation of the scrambler as a whole. This prior art solution, however, has a problem in providing a fair degree of secrecy since for decoding the secret codes, one only needs to perform a limited number of mathematical operations. The mathematical operations may be performed quickly and effectively by modern, high-speed computers and/or devices.

A main characteristics of a crypt-system is the degree of secrecy. The task of a cryptographer is to provide the utmost secrecy and authenticity of the transferred information. Alternatively, a crypt-analyst "forces open", or "breaks", the crypt-system designed by a cryptographer. The crypt-analyst tries to decipher the set of encoded symbols and to deliver the encrypted communication as the plaintext.

Prior art discloses technical solutions for protecting the transferred information by using a specific device and/or encoding software. Known codes are based on two simple methods. substitution and interchange. Interchange uses simple mixing of plain-text symbols. The key of an interchange encryptor defines the specific type of mixing. The frequency distribution of individual symbols in the encoded text is identical to that of the plaintext. For substitution, each symbol of the plaintext is replaced by another symbol of the same alphabet, and the specific type of substitution is determined by the secret key.

For example, the algorithm in the Data Encryption Standard (DES) uses substitution and interchange. Schmidt M. E., Bransted D. K. "Standard of Data Encoding: Past and Future" Journal of Works of Electronic and Radio Engineers (TIIER), 1988, v.76, no. 5., p. 33–34. The algorithm comprises plaintext, enciphered text and the key as binary sequences having the length 64, 64 and 56 bits, respectively. When DES is used in an electronic book or table mode, the 64-bit blocks of the plaintext are encoded independently by using one key.

The algorithm of DES includes 16 rounds or cycles, each of which has simple interchanges combined with substitution in four-bit groups. In each pass, 48 key bits are selected in a pseudo-random manner from the full 56-bit key.

DES does not provide a fair degree of secrecy with $2^{64}$ keys, since substitution of all keys during a brute-force attack using modern computer techniques is performed in an acceptable time. Also, using the same plaintext and not varying the keys, produces the same encoded text. Analysis reveals the statistical regularity of the correlation between the plaintext and the encoded text, and may allow decoding the encoded text without using direct substitution of all the keys.

A crypt-system using public keys is described in Schmidt M. E., Bransted D. K. "Standard of Data Encoding: Past and Future" Journal of Works of Electronic and Radio Engineers (TIIER), 1988, v. 76, no. 5., p. 37–39. This system uses a one-way function—discrete logarithms raising to a power, modulus a prime number.

Hatching is disclosed in Information Technology, Crypt Graphical Protection of Information, Cash function. M.: Gosstandart of Russia, 1994, 34.11–94, p. 3–8. Hatching uses an optional set of data, a sequence of binary symbols, with a short, fixed length. In this system 64-bit subwords are encoded using keys of 256 bit length.

The drawbacks of these systems are small the key length, which may permit decoding during acceptable time, even at a slow decoding speed. These systems are practically stable systems.

Theoretically stable systems have perfect secrecy. Shannon C. E.. "Communication Theory in Secret Systems". Shannon C. E. "Works on Information and Cybernetics Theory". M.: IL, 1963, p. 333–402, "Theoretically Stable system,", as cited in "An Introduction to Contemporary Cryptology", Proceedings of the IEEE, v. 76. No. 5, May 1998. Theoretically stable systems means that the plaintext, and the encoded text or cryptogram, are statistically independent for all plaintext and cryptograms.

A prior art Vernan crypt-system is a theoretically stable crypt-system. Theoretically stable systems make certain demands on a key. For a system with closed keys the length of a key should be not less than the length of the plaintext. In the Vernan system the key length is equal to the length of the plaintext. This system was used in a code-notebook, similar to a one-time pad. Vernan. "Copher Printing Telegraph Systems for Secret Wire and Radio Telegraphic Communications," J Amer. Inst. Elec. Eng., vol. 55, pp. 109–115, 1926., describes a key which can be used only for transfer of one encoded text. This is the main drawback of a codebook because the key should be changed and delivered transferee with every encoded text.

Crypt-systems using randomisers are disclosed in Schmidt M. E., Bransted D. K. "Standard of Data Encoding:

Past and Future" Journal of Works of Electronic and Radio Engineers (TIIER), 1988, v. 76, no. 5., p. 26–27. A randomiser is a software or a hardware device, that encodes some symbols of plaintext with some random codes. Typically, the randomiser provides equal frequency of the plaintext alphabet. Symbol frequency equalization is required so that a crypt-analyst cannot organize decoding of a plaintext based on analysis of frequency characteristics of encoded text. For a random plaintext and a random selection of a code, a derandomiser should correctly determine the initial symbol without transfer of information from the randomiser location. In classical systems, this task is solved by substituting codes belonging to the randomised symbol. Randomisers, however, do not play a substantial role in crypt-protectability of an encoding system, as secret keys are the main means of protection.

Related prior art includes "The First Years of Cryptography with Public Keys", Proceedings of IEEE, v. 76, no. 5, May 1988, which describes the CY 1024 processor chip, manufactured by Cylink Corporation in Sunnyvale, Calif. The description indicated that the CY 1024 processor chip implements the RSA cryptographic system.

SUMMARY OF THE INVENTION

A general object of the invention is an encryption system which cannot be deciphered by crypt-analysis using existing technology.

Another object of the invention is an encryption system capable of generating encrypted or encoded symbols, which cannot be crypt-analyzed to determine the original symbols of the set of initial symbols. The "set of initial symbols" refers to the message to be encoded.

An additional object of the invention is a method for encoding and transferring or storing of information, wherein a key for decoding a set of encoded symbols is provided to an addressee in advance. The key includes information on the regularities that establish correspondence between the values of the transferred set of encoded symbols and definite symbols of the set of initial symbols, and vise versa. The mentioned regularities are used to process the information transferred to the addressee, a communication comprising data obtained as a result of processing the information. The values of the transferred data are calculated depending on randomly generated numbers during processing the information.

A further object of the invention is providing an improved method for encoding by completely randomizing the input information, with a very large field of randomization, so that the set of encoded symbols becomes statistically independent from the input information, with a specified arbitrarily large probability within precision of calculation.

According to the present invention, as embodied and broadly described herein, a method and apparatus for encoding a set of initial symbols from a plurality of elemental symbols, is provided. The plurality of elemental symbols refers to the complete set of symbols from which the set of initial symbols is generated. The method comprising the steps of generating, for each symbol, a first parameter representing a number of intervals of a numeric axis, a plurality of second parameters representing a plurality of lengths of intervals of the numeric axis, and a plurality of third parameters representing a plurality of locations of the intervals on the numeric axis, respectively. For each initial symbol of the set of initial symbols, a random-number generator generates the first key symbol (X) from the starting symbol. The starting symbol sets the random-number generator as a random sequence, which may be repeated at an addressee who has a decoder. The starting symbol preferably is generated from a random-number generator, so that the starting symbol does not repeat with regularity.

The method further comprises a step of transforming the first key symbols (X), by using a plurality of key parameters for keys, into the first encoded symbols. The method may further comprise the steps of generating from the initial symbol a second key symbols (Z) for each symbol of the set of initial symbols, the step of transforming the second key symbols (Z) by using a plurality of additional key parameters of the second encoded symbols, and the step of integrating the first encoded symbols and the second encoded symbols into the final encoded symbols. These later steps may be realized, by way of example, by generating with the first parameter, the second plurality of parameters, and the third plurality of parameters, a key function for each symbol of the plurality of elemental symbols, respectively. The method further includes the steps of transforming, using the respective key function, each symbol from the set of initial symbols, to a plurality of individual symbols, of preliminary encoded symbols, respectively. Optionally, an encryptor, using the plurality of key symbols as a reference key, encodes the set of initial symbols as an set of encoded symbols, respectively.

The method further may include the steps of generating, with a supplemental function, for each symbol, a supplemental symbol, and combining a supplemental symbol with a respective individual symbol to generate a key symbol. If these two additional steps are employed, then the step of encoding includes the step of encoding, using any of the symbol unit and an encryptor, using the plurality of key symbols as a key, the set of initial symbols as an set of encoded symbols, respectively.

The step of transforming may include the step of transforming, starting from an initial value for each symbol using the respective key function, the set of initial symbols to a plurality of key symbols, respectively.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWING

The accompanying drawings, which are incorporated in and constitute a part of the specification, illustrate a preferred embodiment of the invention, and together with the description serve to explain the principles of the invention.

FIG. 11 shows a histogram of an set of encoded symbols generated from the input set of symbols of FIG. 10, with the key functions and supplemental functions of FIG. 9.

DETAILED DESCRIPTION OF THE PREFERRED EMBODIMENTS

Figure 1:
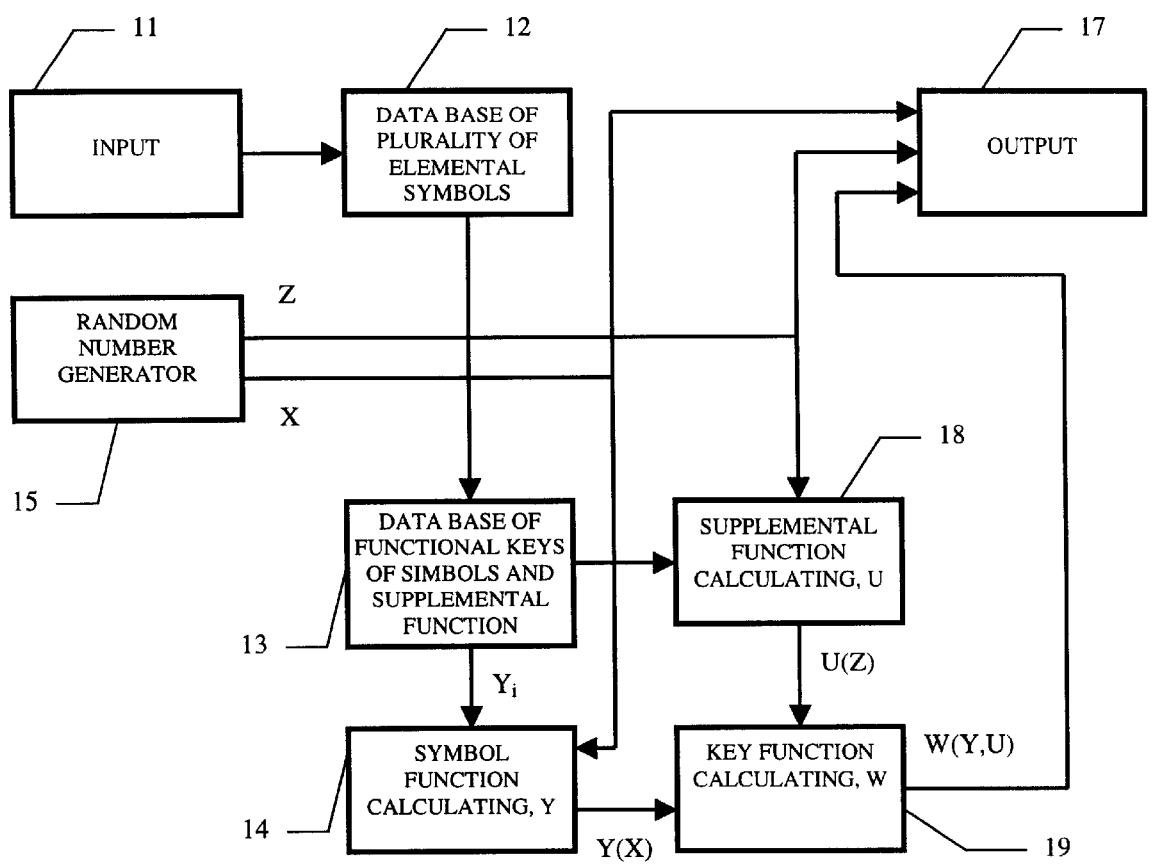
FIG. 1 is a block diagram of an apparatus for encoding information.

Reference now is made in detail to the present preferred embodiments of the invention, examples of which are illustrated in the accompanying drawings, wherein like numbers represent like elements.

The present invention provides a novel method and apparatus for encoding a set of initial symbols to a set of encoded symbols. The decoding decodes the set of encoded symbols as a set of decoded symbols, which are identical to the set of initial symbols with proper decoding. The advantage of the present invention is that the set of encoded symbols cannot be analyzed by conventional crypt-analysis techniques, since the set of encoded symbols is statistically independent with the set of initial symbols, and uncorrelated with regularities of the original source of symbols, denoted herein as the plurality of elemental symbols. The method and apparatus may be implemented individually or in combination, in hardware, discrete components, firmware and/or software. Typically, the implementation might be as a processor and memory, a digital signal processor (DSP), or an application specific integrated circuit (ASIC). The processor and memory would include software, and maybe implement as a computer program on a computer.

As illustratively shown in FIGS. 1–8, a method and an apparatus for encoding a set of initial symbols to a set of encoded symbols, and for decoding a set of encoded symbols to a set of decoded symbols, is provided. The input information, sometimes referred to as input text or plaintext, is referred to herein more broadly as the "set of initial symbols". The encoded information, also known as encoded text or cypher text, is referred to herein more broadly as "set of encoded symbols". The set of initial symbols may be plaintext, previously encoded text, digital information, symbols from a plurality of elemental symbols, a message, a digital picture, or other digital signal. It is well known in the art, that symbols may be digital words, with lengths defined for particular applications.

A message, broadly, is a carrier of information. A message includes a set of initial symbols. An encoded symbol is obtained by encoding an initial symbol. A cryptogram is obtained by encoding a message, and includes a set of encoded symbols.

The set of initial symbols is generated from a plurality of elemental symbols. The "plurality of elemental symbols" refers herein to the complete set of symbols from which the set of initial symbols is generated. The plurality of elemental symbols, by way of example, may refer to the alphabet of a language, in Russian or in English. The set of initial symbols refers to information, or message, generated from elemental symbols, or letters, from the alphabet in Russian. Thus, in Russian, the plurality of elemental symbols may be the 34 letters of the Russian alphabet. In English, the plurality of elemental symbols may be the 26 letters of the English alphabet. An elemental symbol need not be a single letter or character from an alphabet. An elemental symbol may include several letters or characters, as specified by a particular application. Furthermore, an elemental symbol may be a digital word, of a specified length or varying length. The digital word might be part of a digital picture.

The set of initial symbols may already be generated at the input to the encoder, thus no transformation to an initial symbol is required. If the plurality of elemental symbols were an alphabet, for example, A, B, C, D . . . , and the input information were a message, such as: MAY THERE ALWAYS BE SUNSHINE, then each letter of the message may be looked up in a data base and transformed into an elemental symbol. For example, if the letters corresponded to numbers with A=01, B=02, C=03, D=04, . . . , with the numbers converted to digital form, as a table lookup, the message would be a set of initial symbols as follows: {13 01 25 20 08 05 18 05 01 12 23 01 25 19 02 05 19 21 14 19 08 09 14 05}. Other elemental symbol encoding, such as ASCII, and application specific codes could be sued. Further, the data base for the plurality of elemental symbols may transform groups of symbols into an elemental symbol, as used by the encoder. For example, the data base of elemental symbols may group input data into 8 bits, so that each elemental symbol has 8 bits. The invention starts with a set of initial symbols, which conform to a particular criteria.

To assist in understanding this invention, "R" represents the total number of elemental symbols in the plurality of elemental symbols. Also, "i", as a subscript, serves as an index to an elemental symbol in the plurality of elemental symbols.

Symbol, Supplemental and Key Functions

For each elemental symbol of the plurality of elemental symbols, a symbol function $Y_i(X)$ and optionally a supplemental function $U_i(Z)$ is generated. The symbol function $Y_i(X)$ and supplemental function $U_i(Z)$ typically are pre-generated and preset in the encoder and decoder. The symbol function $Y_i(x)$ and supplemental function $U_i(Z)$ may be re-generated as new functions, and changed per system requirements. To understand to invention, an example of the symbol function $Y_i(X)$ is generated and presented in FIG. 9.

This discussion presents how to generate a symbol function $Y_i(X)$. The supplemental function $U_i(Z)$ is generated similarly to the symbol function $Y_i(X)$. A symbol function $Y_i(X)$ is generated for each elemental symbol in the plurality of elemental symbols.

Broadly, a symbol function $Y_i(X)$, or supplemental function $U_i(Z)$, is a plurality of segmented functions. The segments are intervals on a numeric axis. The numeric axis is the typical abscissa axis in a graph. The segmented functions transform a variable during the encoding process.

For each elemental symbol of the plurality of elemental symbols, a first parameter representing a number of intervals of a numeric axis, is generated or chosen. A plurality of second parameters is generated or chosen representing a plurality of lengths of intervals of the numeric axis. A plurality of third parameters is generated or chosen representing a plurality of locations for symbol functions and/or supplemental functions, respectively. In an embodiment, the first parameter might be eight, although any number may work. Each length of each interval of the plurality of intervals may be of equal value, or of unequal value. Of the plurality of locations, each location for the beginning of a symbol function $Y_i(X)$ or supplemental function $U_i(Z)$, typically is located at the beginning of each interval of the plurality of intervals, respectively. The beginning of a symbol function $Y_i(X)$ or supplemental function $U_i(Z)$, and the beginning of the interval of the symbol function $Y_i(X)$ or supplemental function $U_i(Z)$, are not necessarily the same. The intervals of the plurality of key functions need not be identical to the intervals of the supplemental functions. A symbol function $Y_i(X)$ or supplemental function $U_i(Z)$ may traverse more than one interval.

Figure 9:
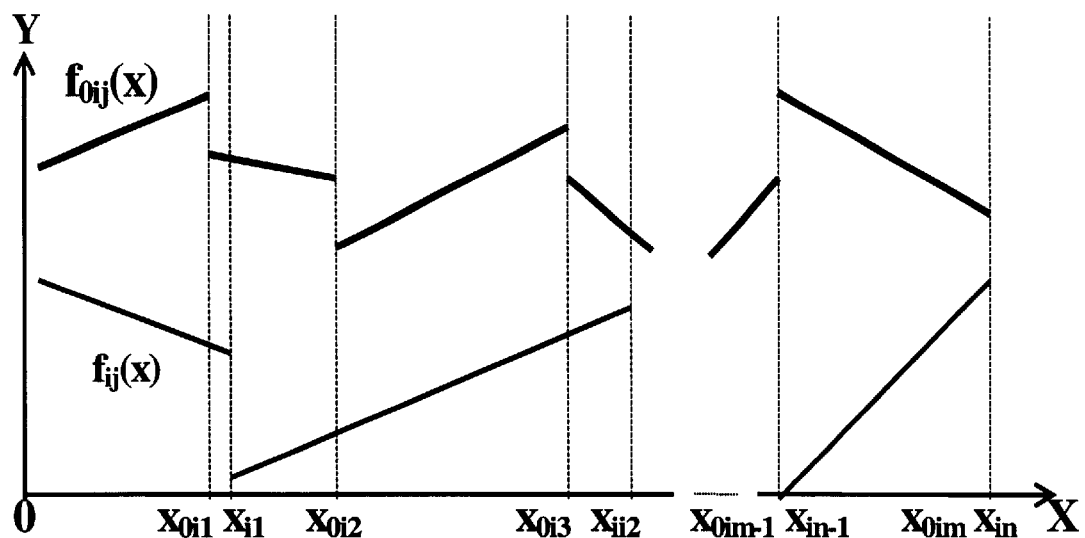
FIG. 9 illustrates an example of symbol functions and supplemental functions.

Each symbol function $Y_i(X)$ or supplemental function $U_i(Z)$ may be a straight line or a curve. A particular symbol function $Y_i(X)$ may be different from other symbol functions. The curve may be generated by a computer or other device. FIG. 9 shows a symbol function, $f_{ij}(x)$, defined for N intervals, by way of example, wherein the symbol function is represented by straight lines. N represents the number of intervals for the symbol function.

Each supplemental function $U_i(Z)$ may be a straight line or a curve. A particular supplemental function $U_i(Z)$ may be different from other symbol functions. The curve may be generated by a computer or other device. FIG. 9 shows a supplemental function, $f_{oj}(x)$, defined on M intervals wherein the supplemental function is represented by straight lines. M represents the number of intervals for the supplemental function. The supplemental functions typically are located in intervals, similar to the symbol functions. The number of intervals and the lengths of intervals for the supplemental functions need not be identical to the number of intervals and lengths of intervals of the symbol functions. Also, the starting points of the supplemental functions need not be the same as the starting point of the symbol functions.

The symbol functions and supplemental functions need not be segmented, and may be the same for the plurality of elemental symbols. Preferably, the symbol functions and supplemental functions have intervals with different functions in each interval, and are different for each elemental symbol.

The invention also uses a key function $W_i(Y_i, U_i)$. For each initial symbol which is transformed by the symbol function $Y_i(X)$ and, if used, supplemental function $U_i(Z)$, the key function $W_i(Y_i, U_i)$ generates a key value from the outputs of the symbol function $Y_i(X)$ and the supplemental function $U_i(Z)$. The key function $W_i(Y_i, U_i)$, similar to the symbol function $Y_i(X)$ and supplemental function $U_i(Z)$, may be a segmented, or an algebraic equation. With the output from the symbol function $Y_i(X)$ designated $Y_i$ and with the output of the supplemental function $U_i(Z)$ designated $U_i$, the key function calculates an encoded-key value $W_{Ei}$ which is a function of the values $Y_i$ and $U_i$. For example, the key function might be $W_i(Y_i, U_i)=Y_i+U_i$. Another example, $W_i(Y_i, U_i)=y^2+U^2$. A further example, $W_i=Y_i*U_i$. Other functions may be used, and the functions may be different or segmented, depending on the input values of $Y_i$ and $U_i$. Due to the three dimensional nature of these functions, a plot is difficult to project on a two-dimensional surface.

If the supplemental function were not used, then the key function may be similar to the symbol function or the supplemental function, already discussed.

Encoding Operation

With the understanding of the symbol function, supplemental function and the key function, the invention for encoding may be understood with reference to FIGS. 1–4.

In the exemplary arrangement shown in FIG. 1, the present invention for encoding comprises an input 11, a first data base 12, a second data base 13, a symbol unit 14, a first unit 18, a second unit 19, a random-number generator 15 and an output 17. The second data base 13 is connected to the output of the first data base 12. The first data base 12 is connected to the input 11. The symbol unit 14 is connected to the outputs of the second data base 13, and of the random-number generator 15. The first unit 18 is connected to the outputs of the second data base 13 and the random-number generator 15. The second unit 19 is connected to the outputs of the symbol unit 14 and the first unit 18. The output 17 is connected to the outputs of the random-number generator 15, and of the second unit 19.

The input is the source of information to be encoded. The information may be the set of initial symbols, or information to be converted to the set of initial symbols.

The first data base 12 stores the plurality of elemental symbols. The first data base 12 is not required, if the input information already is in the form of the set of initial information. If the input information is to be converted to the set of initial symbols, then the first data base 12 serves as a lookup table. For example, the first data base 12 may be a memory with an address and storage cells. The address serves as a pointer for a particular letter or character from the information, and the storage cell corresponding to an address stores the corresponding initial symbol. Such techniques are well-known in the art.

The random-number generator 15 generates a first random number X and a second random number Z. Generating random numbers is well-known in the art. By way of example, generating random numbers on a computer is based on mathematical calculations that use some random value, produced from a clock or other source. Such random generators, strictly speaking, are called pseudo-random number generators. In contrast, the purely random numbers are normally produced by the sources that use natural physical phenomena, such as isotope radio emission, Brownian thermal motion, etc. Either embodiment in meant to be included for the invention.

The values X and Z are referred to hereinafter as first random number and second random number, respectively, whether they were generated randomly or pseudo-randomly. A person skilled in the art would recognize that first random number X and the second random number Z better implement the invention as true random variables, but the invention is viable with pseudo-randomly generating first random number X and second random number Z.

The second data base 13 stores the symbols functions for each symbol, the supplemental functions and the key functions. A particular initial symbol from the input 11, or converted from the first data base 12, may serve as an index to lookup a corresponding symbol function, and supplemental function.

The symbol function calculator 14, using the corresponding symbol function from the second data base 13, calculates for each initial symbol $Y_i$ and a correspondingly randomly generated first random variable X, a value $Y_i(X)$. The calculation is performed by having the initial symbol $Y_i$ select the respective symbol function $Y_i(X)$, and using the first random variable X on the numeric axis, as shown in FIG. 9, to select the correct ordinate value. The plurality of symbol functions can be viewed as an indexed set of functions, with the plurality of elemental symbols serving as an index, and pointing to a set of symbol functions. Thus, the symbol function $Y_i(X)$ is preferably different for each symbol, due to a different function and due to the variation of the function over a plurality of intervals. Also, due to the first random variable X, the selected output 20 from a respective symbol function is a random number, outputted as value $Y_i(X) \rightarrow Y_i$.

Similarly, supplemental function calculator 18, using the corresponding supplemental function $U_i(Z)$ from the second data base 13, calculates for each initial symbol $Y_i$ and a correspondingly randomly generated second random variable Z, a supplemental value $U_i$ from the supplemental function $U_i(Z)$. The calculation is performed by having the initial symbol select the respective supplemental function $U_i(Z)$ using the second variable Z on the numeric axis, as shown in FIG. 9, to select the correct ordinate value. The plurality of supplemental functions can be viewed as an indexed set of functions, with the plurality of elemental symbols serving as an index, i=1, 2, 3, . . . , R, and pointing to a set of supplemental functions for a particular elemental symbol. Thus, the supplemental function $U_i(Z)$ is preferably different for each elemental symbol, due to different functions and due to the variation of the functions over a plurality of intervals. Also, due to the second random variable Z, the selected output from a respective supplemental function is a random number, outputted as value $U_i(Z) \rightarrow U_i$.

The key function calculator 19 uses a key function $W_i(Y_i, U_i)$, and the outputs from the symbol function calculator 14 and the supplemental function calculator 18, to calculate a key value $W_i$. The key function may be the same for all values from the symbol function calculator 14 and the supplemental function calculator 18, or vary depending on the value from the symbol function calculator 14 and the supplemental function calculator 18.

For each initial symbol from the set of initial symbols, the encoding apparatus outputs the first random number X, the second random number Z, and the encoded-key value $W_{Ei}$. These three values are used by the decoding apparatus to generate a decoded symbol, which corresponds with the encoded symbol. The key value contains an encoded version of the initial value. The encoded symbol for this case would be considered to be the three values: first random number X, second random number Z, and encoded-key value $W_{Ei}$. A set of encoded symbols $\{E_1, E_2, E_3, \ldots\}$ might be represented as follows: $\{X_1, Z_1, W_1, X_2, Z_2, W_2, X_3, Z_3, W_3, \ldots\}$, where $E_1=\{X_1, Z_1, W_1\}$, $E_2=\{X_2, Z_2, W_2\}$, $E_3=\{X_3, Z_3, W_3\}, \ldots$.

Figure 2:
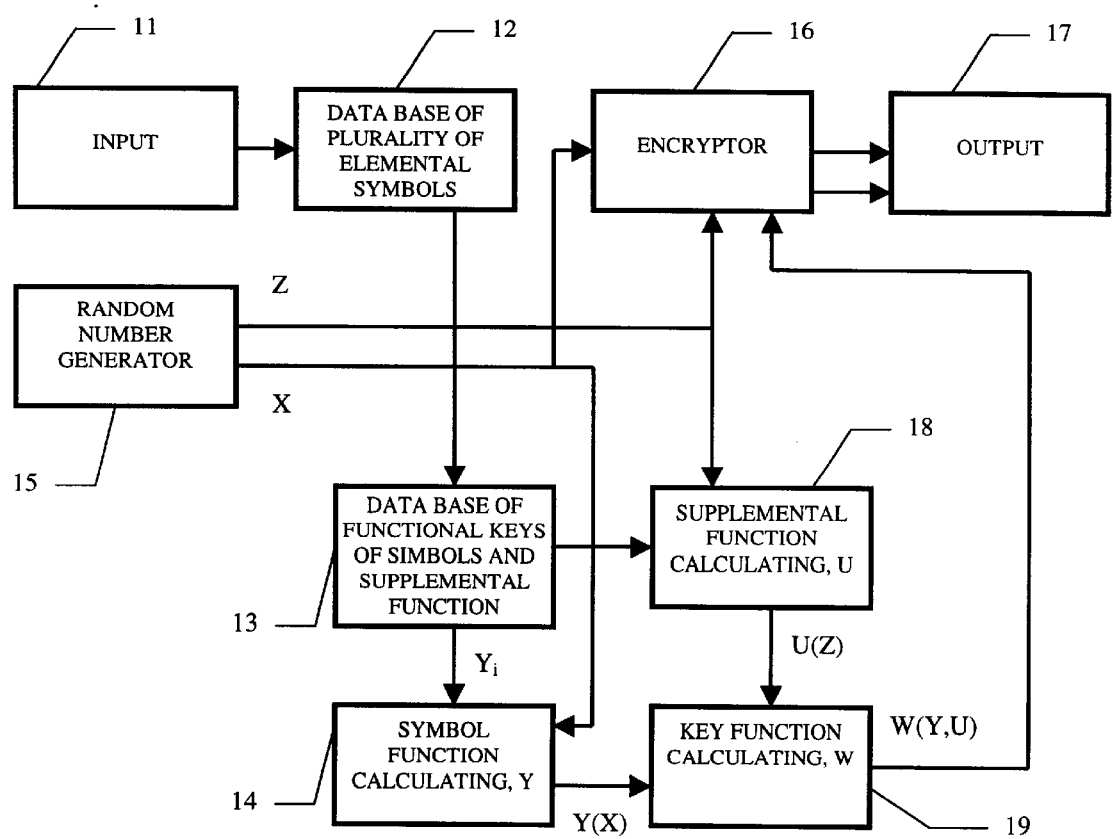
FIG. 2 is a block diagram of an apparatus for encoding information with an additional encryptor.

A variation to the encoding apparatus is shown in FIG. 2. An encryptor 16 is added. The encryptor 16 might be, by way of example, the DES or a proprietary encryption engine. A separate key would be used with the encryptor 16. The encryptor 16 encrypts each key value to a further encrypted value. Thus, each encoded-key value $W_{Ei}$ would become an encrypted value S. The first random variable X and the second random variable Z pass through to the output 17. The encrypted value S contains an encrypted and encoded version of the initial value. The encoded symbol E for this case would be considered to be the three values: first random number X, second random number Z, and encrypted value S. A set of encoded symbols $\{E_1, E_2, E_3, \ldots\}$ might be represented as follows: $\{X_1, Z_1, S_1, X_2, Z_2, S_2, X_3, Z_3, S_3, \ldots\}$, where $E_1=\{X_1, Z_1, S_1\}$, $E_2=\{X_2, Z_2, S_2\}$, $E_3=\{X_3, Z_3, S_3\}, \ldots$.

Figure 3:
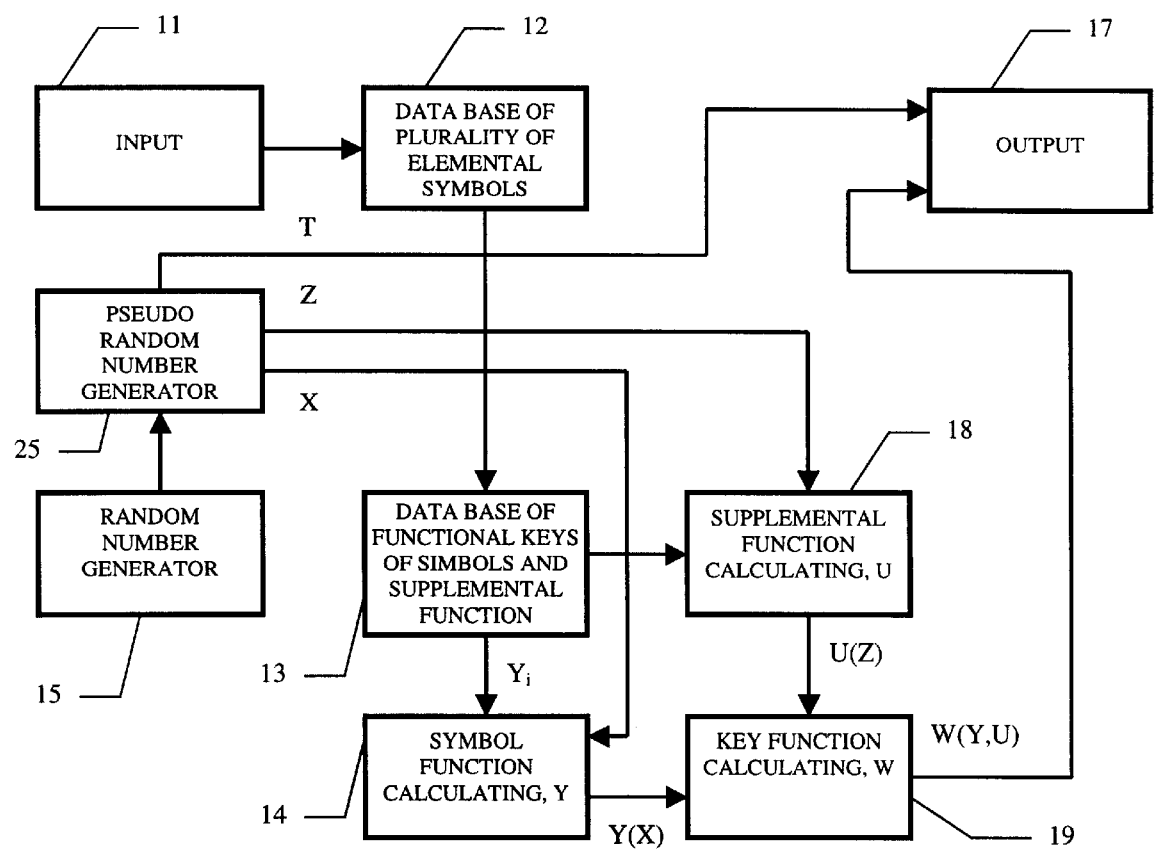
FIG. 3 is a block diagram of an apparatus for encoding information with an additional pseudo-random generator.

A variant to the encoding apparatus of FIG. 1 is shown in FIG. 3. In FIG. 3, a pseudo-random number generator 25 is inserted between the random-number generator 15 and the symbol function calculator 14, supplemental function calculator 18, and the output 17. The random-number generator 15 generates a random number as seed number T or starting point for the pseudo-random number generator 25. The seed number T is passed to the output 17. The seed number initiates a starting point for the pseudo-random number generator 25. The pseudo-random number generator 25 then generates first random number X and second random number Z. With this modification, at the output, only the seed number T and the set of key values are sent as encoded symbols. A set of encoded symbols $\{E_1, E_2, E_3, \ldots\}$ might be represented as follows: $\{T, W_1, W_2, W_3, \ldots\}$, where $E_1=\{W_1\}$, $E_2=\{W_2\}$, $E_3=\{W_3\}, \ldots$.

Figure 4:
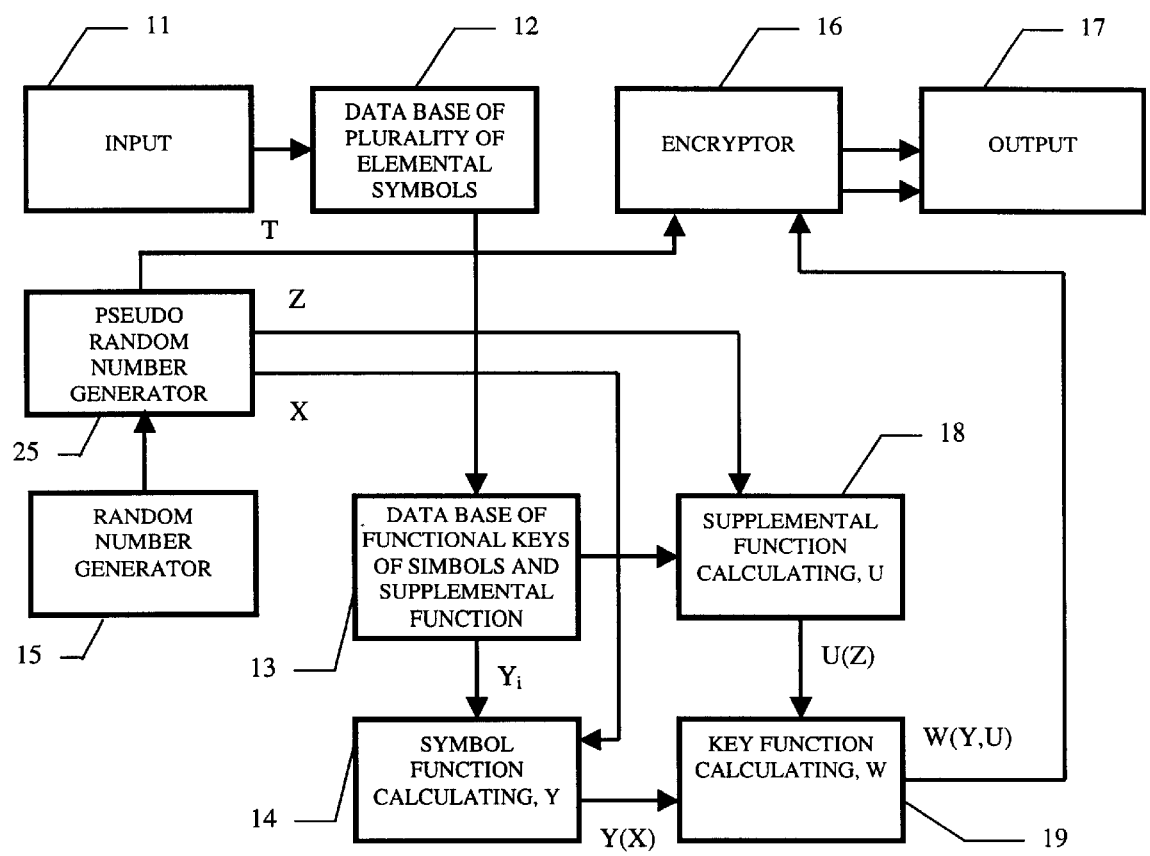
FIG. 4 is a block diagram of an apparatus for encoding information with an additional encryptor and pseudo-random generator.

A further variant to the encoding apparatus of FIG. 2 is shown in FIG. 4. A pseudo-random number generator 25 is inserted between the random-number generator 15 and the symbol function calculator 14, supplemental function calculator 18, and the output 17. The random-number generator 15 generates a random number as seed number T or starting point for the pseudo-random number generator 25. The seed number T is passed to the output. The seed number initiates a starting point for the pseudo-random number generator 25. The pseudo-random number generator 25 then generates first random number X and second random number Z. In FIG. 4, an encryptor 16 is added. The encryptor 16 might be, by way of example, the DES or a proprietary encryption engine. A separate key would be used with the encryptor 16. The encryptor 16 encrypts each key value to a further encrypted value. Thus, each encoded-key value $W_{Ei}$ would become an encrypted value S. The first random variable X and the second random variable Z pass through to the output 17. The encrypted value S contains an encrypted and encoded version of the initial value. With this modification, at the output, only the seed number T and the set of encrypted symbols are sent as encoded symbols. The encoded symbol E for this case would be considered to be the encrypted value S. A set of encoded symbols $\{E_1, E_2, E_3, \ldots\}$ might be represented as follows: $\{T, S_1, S_2, S_3, \ldots\}$, where $E_1=\{S_1\}$, $E_2=\{S_2\}$, $E_3=\{S_3\}, \ldots$ Many variations may be made to the encoding apparatus of the present invention. For example, the set of symbol functions may be replaced by a group of symbol functions for each elemental symbol. An initial symbol might point to a group of symbol functions which may change. Alternatively, a more random variables may be generated, and set to a plurality of symbol functions for processing each initial symbol. Similarly, the supplemental functions may be expanded so that a plurality of supplemental functions are used for each initial symbol. Alternatively, each of the plurality or supplemental functions for each initial symbol may receive a separate random number from the random-number generator 15 or pseudo-random-number generator 25.

Decoding Operation

With the understanding of the symbol function, supplemental function and the key function, as well as the overall encoding operation, the invention for decoding may be understood with reference to FIGS. 5–8.

Figure 5:
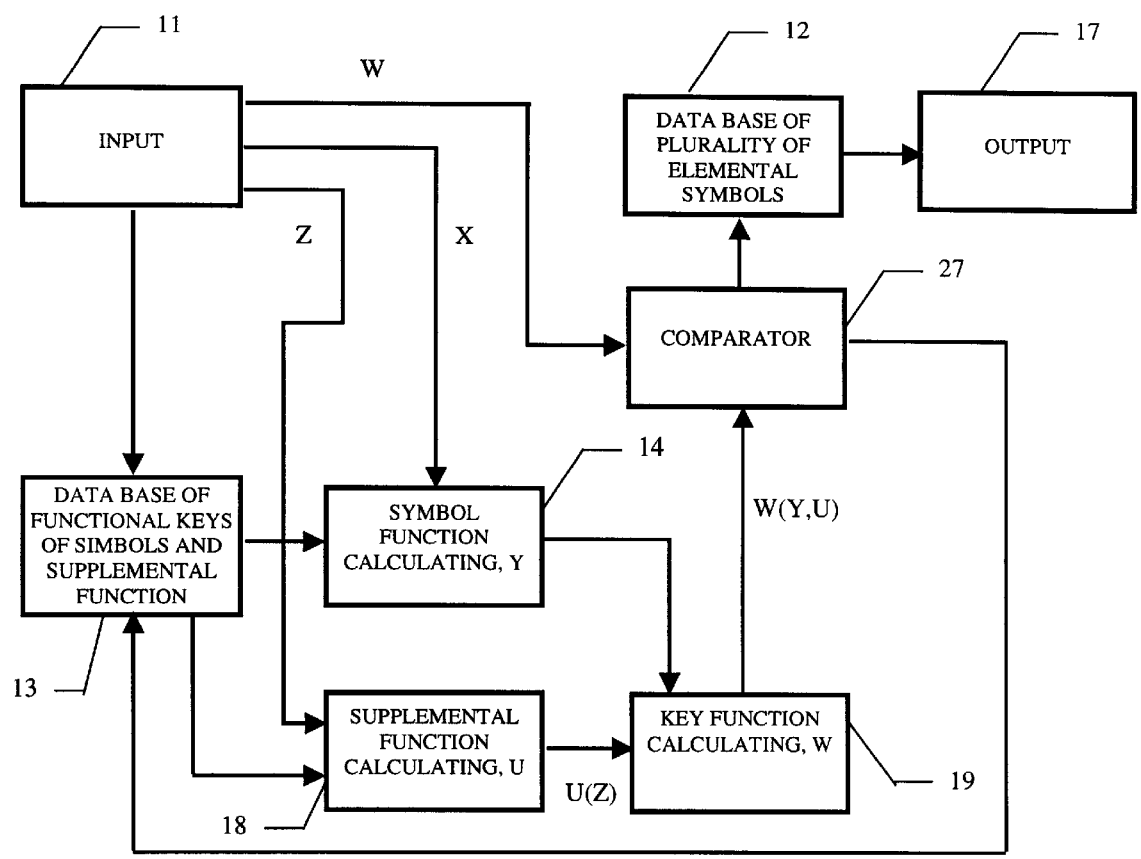
FIG. 5 is a block diagram of an apparatus for decoding information.

In the exemplary arrangement shown in FIG. 5, the decoding operation, for the encoding operation of FIG. 1, comprises the input 11, the first data base 12, the second data base 13, the symbol unit 14, the first unit 18, the second unit 19, comparator 27, and an output 17. The a random-number generator 15 is not required for the decoding operation. The present invention anticipates that an encoding operation and a decoding operation are performed within a complete set of the two-way communications system or where data are stored in a storage medium, such as a memory or disk, and hence are positioned at the same location, and thus, common elements from the encoding operation are used with the decoding operation. The second data base 13 is connected to the input 11 and the comparator 27. The symbol unit 14 is connected to the output of the second data base 13, and to the input 11. The first unit 18 is connected to the output of the second data base 13 and to the input 11. The second unit 19 is connected to the outputs of the symbol unit 14 and of the first unit 18. The symbol unit 14 is connected to the output of the second data base 13 and to the input 11. The comparator is connected to the output of the second unit 19 and to the input 11. The first data base 12 is connected to the output of the comparator 27. The output 17 is connected to the output of the comparator 27.

The input is the source of the set of encoded symbols to be decoded. For the decoding operation, the set of encoded symbols previously was generated by the encoding operation, with identical sets of symbol functions, supplemental functions and key functions. An encoded symbol for the decoding operation in FIG. 5 would be a set of three values: first random number X, second random number Z, and encoded-key value $W_{Ei}$. Thus, at the input, a set of encoded symbols $\{E_1, E_2, E_3, \ldots\}$ might be represented as follows: $\{X_1, Z_1, W_1, X_2, Z_2, W_2, X_3, Z_3, W_3, \ldots\}$, where $E_1=\{X_1, Z_1, W_1\}$, $E_2=\{X_2, Z_2, W_2\}$, $E_3=\{X_3, Z_3, W_3\}, \ldots$.

As with the encoding operation, the second data base 13 stores the symbols functions for each symbol, the supplemental functions and the key functions. A difference from the encoding operation, is that for an encoded symbol E at the input 11, a control signal is sent to the second data base 13 to initiate a sequential operation through the plurality of elemental symbols, $i=1, 2, 3, \ldots$, until a match is found. The match is at the comparator 27, which compares the encoded-key value $W_{Ei}$ with a decode-key value $W_D$. When a match is found, the elemental symbol which generated the decoded-key value $W_D$ is outputted as the correct decoded symbol, which is the same as the initial symbol which generated the encoded-key symbol $W_{Ei}$.

The symbol function calculator 14, using a symbol function $Y_i(X)$ from the second data base 13, calculates for each elemental symbol and the correspondingly generated first random variable X, a value $Y_i(X)$. The calculation is performed by having each elemental symbol select the respective symbol function $Y_i(X)$, and, from the encoded symbol $E_i=\{X, Z, W_1\}$, using the first random variable X on the numeric axis, as shown in FIG. 9, to select the corresponding ordinate value. The plurality of symbol functions can be viewed as an indexed set of functions, with the plurality of elemental symbols serving as an index, $i=1, 2, 3, \ldots$, and pointing to a set of functions. Due to the first random variable X, the selected output from a respective symbol function is a number which may or may not produce a match. The outputted value from the symbol calculator: $Y_i(X) \rightarrow Y_i$.

Similarly, supplemental function calculator 14, for the elemental symbol being tested, selects the supplemental function from the second data base 13, and calculates for the elemental symbol and a correspondingly second random variable Z, a supplemental value $U_i$ from the supplemental function $U_i(Z)$. The calculation is performed by having the elemental symbol select the respective supplemental function, and using the second variable Z on the numeric axis, as shown in FIG. 9, to select a corresponding ordinate value. Due to the second random variable Z, the selected output from a respective symbol function is a number which may or may not produce a match at comparator 27. The outputted value from the supplemental calculator: $U_i(Z) \rightarrow U_i$.

The key function calculator 19 uses the key function $W_i(Y_i, U_i)$, and the outputs from the symbol function calculator 14 and the supplemental function calculator 18, to calculate a key value $W_i$. The key function is the same as was used with the encoding operation.

For each elemental symbol from the plurality of elemental symbols, the comparator 27 compares the decoded-key value $W_D$ with the encoded-key value $W_{Ei}$. If there is a match, then the elemental symbol which produced the match is outputted as the decoded symbol, and is the same as the initial symbol which produced the corresponding encoded symbol.

The first data base 12 stores the plurality of elemental symbols used for the encoding operation. The first data base 12 is not required, if the input information already were in the form of the set of initial symbols. In this case, the output information is the set of decoded symbols, which is the set of initial symbols. If the input information were converted from an alphabet of characters to the set of initial symbols, then the first data base 12 serves as a lookup table for decoded symbols being outputted. The example is a memory with an address and storage cells. The address serves as a pointer for a particular letter or character from the information, and the storage cell corresponding to an address stores the corresponding initial symbol. Such techniques are well-known in the art.

Figure 6:
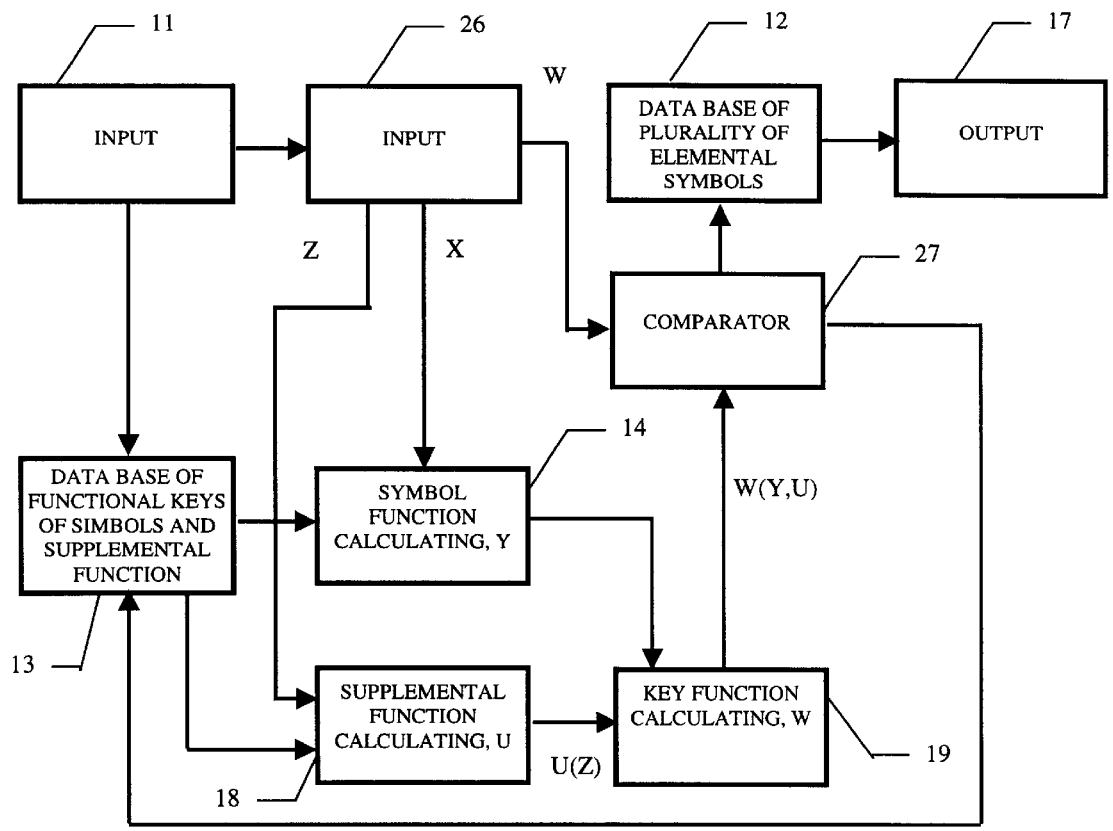
FIG. 6 is a block diagram of an apparatus for decoding information with an additional decryptor.

A variation to the decoding operation of FIG. 5, corresponding to the encoding operation in FIG. 2, is the decoding operation shown in FIG. 6. A decryptor 26 is added. The decryptor 26 might be, by way of example, the DES or a proprietary encryption engine, corresponding to the encryptor 16 of FIG. 2. A separate key would be supplied for use with the decryptor 26. The decryptor 26 decrypts each encoded-key value to a decrypted value. Thus, the encrypted value S is decrypted as an encoded-key value $W_{Ei}$, which is then compared as discussed with FIG. 5. The first random variable X and the second random variable are used with each elemental symbol, with the symbol function, supplemental function and key function, to produce a decoded-key value. The decoded key value is compared by comparator 27 with the encoded-key value. If there were a match, then the elemental symbol which produced the match is outputted as the decoded symbol, and the outputted elemental symbol is the same as the initial symbol which produced the corresponding encoded symbol.

Figure 7:
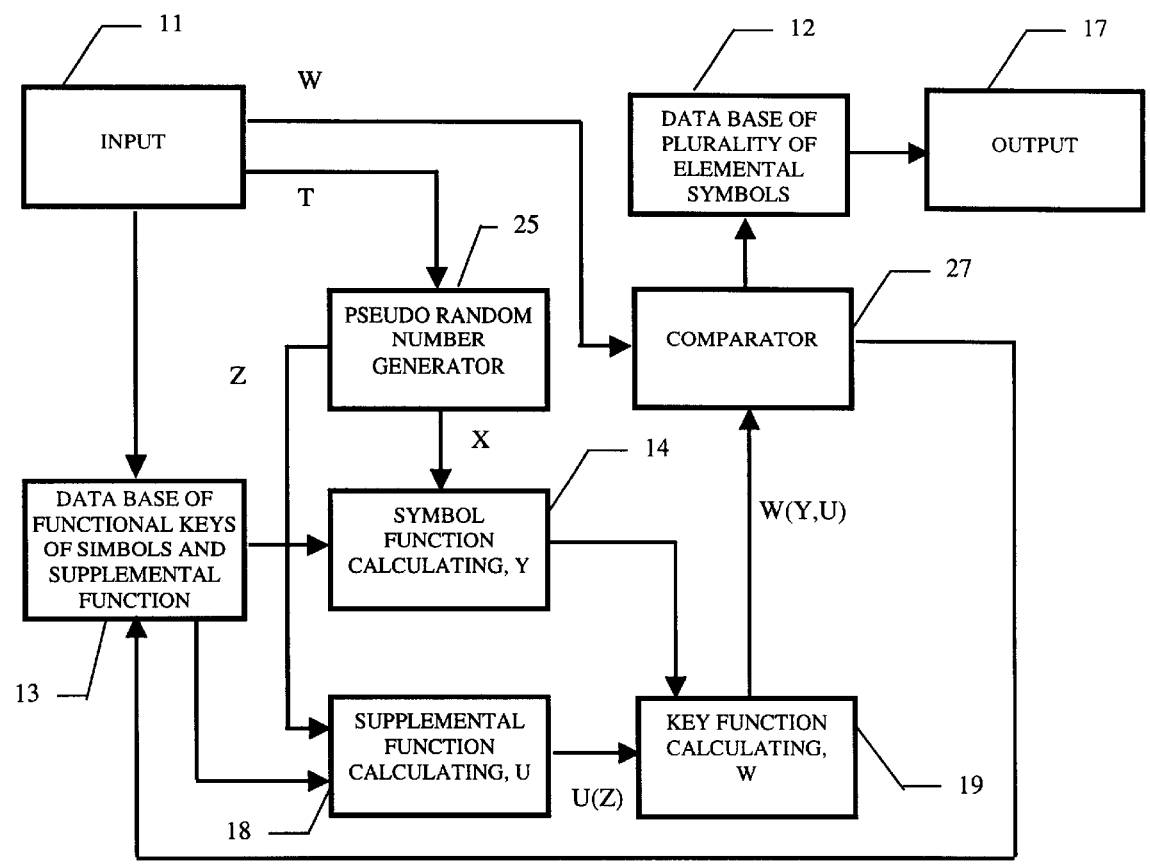
FIG. 7 is a block diagram of an apparatus for decoding information with an additional pseudo-random generator.

A variation to the decoding operation of FIG. 5, corresponding to the encoding operation in FIG. 3, is the decoding operation shown in FIG. 7. In FIG. 7, a pseudo-random-number generator 25 is inserted between the input 11 and the symbol function calculator 14, and the supplemental function calculator 18. The seed number T is used to set the pseudo-random number generator 25, so that a sequence of first random numbers X and second random numbers Z and matched to the sequence used to generate the encoded-key symbols $W_{Ei}$. Thus, the seed number initiates a starting point for the pseudo-random number generator 25. The pseudo-random-number generator 25 then generates first and second random numbers X and Z, respectively. With this modification, for each elemental symbol from the plurality of elemental symbols, the comparator 27 compares the decoded-key value AD with the encoded-key value $W_{Ei}$. If there were a match, then the elemental symbol which produced the match is outputted as the decoded symbol, and the outputted elemental symbol is the same as the initial symbol which produced the corresponding encoded symbol.

Figure 8:
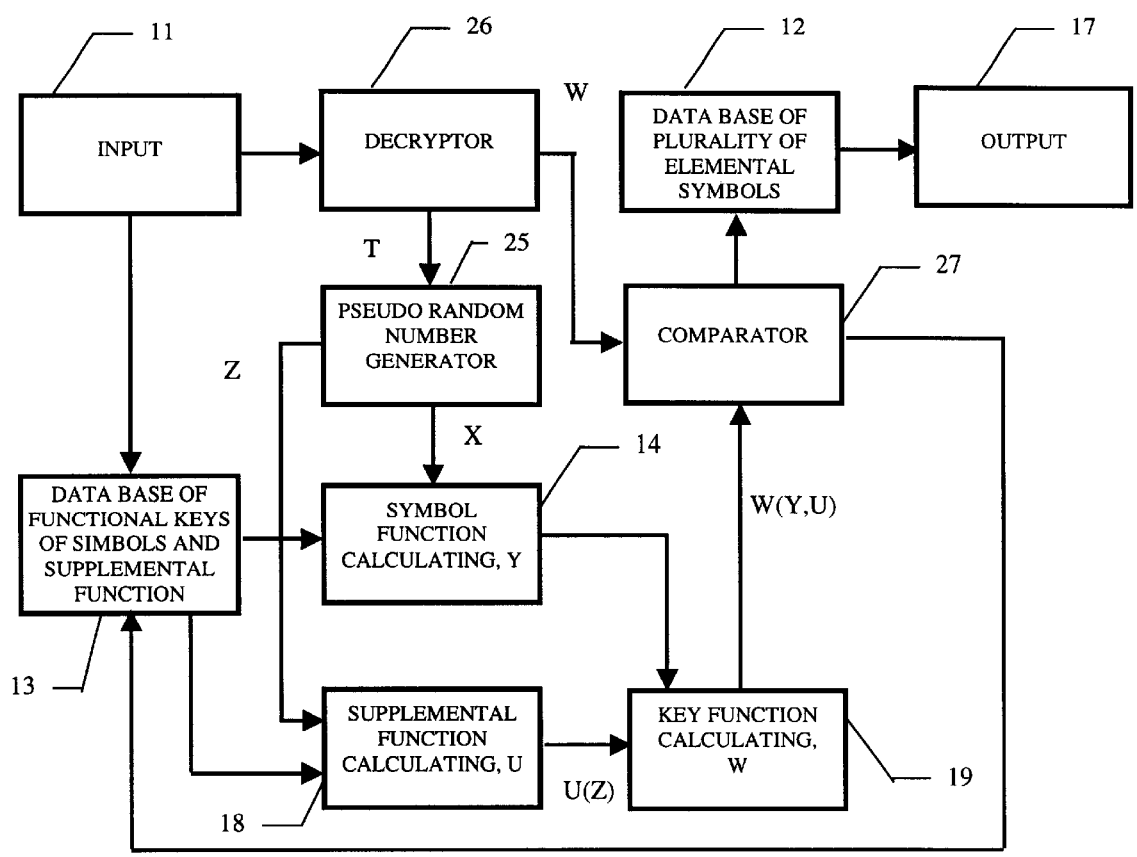
FIG. 8 is a block diagram of an apparatus for decoding information with an additional decryptor and pseudo-random generator.

A variation to the decoding operation of FIG. 5, corresponding to the encoding operation in FIG. 4, is the decoding operation shown in FIG. 8. In FIG. 8, decryptor 26 is inserted in between the input 11 and the comparator 27. Also, a pseudo-random number generator 25 is inserted between the input 11 and the symbol function calculator 14, and the supplemental function calculator 18. The seed number T is used to set the pseudo-random-number generator 25, so that a sequence of first random numbers X and second random numbers Z are matched to the sequence used to generate the encoded-key symbols $W_{Ei}$. A separate key would be supplied for use with the decryptor 26. The decryptor 26 decrypts each encoded-key value to a decrypted value. Thus, the encrypted value S is decrypted as an encoded-key value $W_{Ei}$. If there were a match, then the elemental symbol which produced the match is outputted as the decoded symbol, and the outputted elemental symbol is the same as the initial symbol which produced the corresponding encoded symbol.

Encoding-Decoding Operation

An addressee is provided in advance with a set of symbol functions $Y_1 \ldots Y_n Y_i = Y_i(X)$, optionally with the supplemental function $U_i = U_i(Z)$, and with a key function $W_i = W_i(Y_i, U_i)$. X and Z are random numbers. Each symbol function $Y_i$ corresponds to a definite initial symbol, indexed by "i", of the set of initial symbols. Symbol value $Y_i$ and supplemental value $U_i$ are variable values taking the values of the symbol function $Y_i$ and the supplemental value $U_i$.

During processing of the set of initial symbols, for each initial symbol, two random values X and Z are generated by the random-number generator 15. The corresponding value for an initial symbol is calculated by symbol unit 14 with the corresponding symbol function $Y_i(X)$. The supplemental value $U_i$ is calculated by first unit 18 with the supplemental function $U_i(Z)$. The key value $W_i$ for this initial symbol is calculated by second unit 19 with the key function $W_i(Y_i, U_i)$ and with the symbol value of $Y_i$, and the supplemental value $U_i$ obtained from the supplemental function. The addressee is forwarded a communication comprising data for generating random value X, supplemental value $U_i$ and the key value $W_i$ for each initial symbol of the set of initial symbols.

A characteristic feature of the new method is that randomisation encodes each initial symbol by a plurality of values which may take the corresponding symbol function $Y_i$. The plurality of values is selected in a random manner, and affects all initial symbols of the set of initial symbols. Therefore, the randomisation may be called a complete one in contrast to the prior art systems, in which symbols are randomized by a limited plurality of codes. During full randomisation at the field of randomisation of a great power, the set of encoded symbols becomes statistically independent from the set of initial symbols, with a specified arbitrarily degree of probability within calculation precision. The statistical independence indicates an absolute stability of the code and system in the whole. If the power of the field of randomisation were large enough to make entropy of the set of encoded symbols to have a large value as well, then the system closely approaches a theoretically closed systems.

Figure 10:
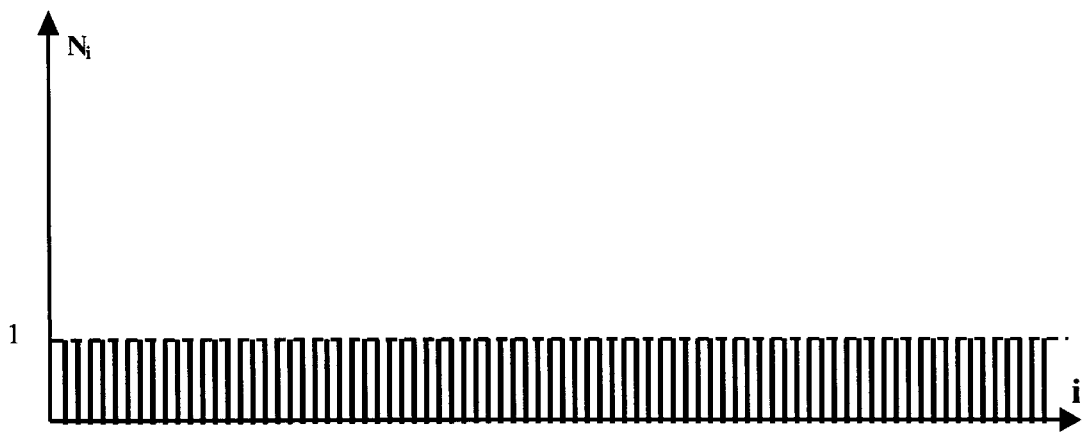
FIG. 10 shows a histogram of an set of initial symbols.

FIG. 10 shows, by way of example, a histogram of an set of initial symbols. FIG. 11 shows a histogram of an set of encoded symbols generated from the input set of symbols of FIG. 10, with the key functions and supplemental functions of FIG. 9.

The invention obtains the following result: At encoding and transferring an set of initial symbols, a key value to receive the set of encoded symbols is provided to the addressee. The addressee also is provided with information on regularities corresponding to the values of the transferred set of encoded symbols with specific initial symbols of the set of initial symbols for the first data base of symbols. The set of initial symbols is processed with the regularities. The set of encoded symbols, which includes data obtained as a result of processing the set of initial symbols, is transferred to the addressee. The values of the transferred set of encoded symbols is calculated from randomly generated numbers, which are calculated during processing of set of initial symbols.

The regularities include characteristics of set of initial symbols or set of encoded symbols, which is used by a crypt-analyst to analyse the set of encoded symbols. The characteristics typically include predictable characteristics, such as frequency of occurrence of elemental symbols, in the set of initial symbols or in the set of encoded symbols. The characteristics for analysing encoded sets of symbols are well-known to those skilled in the art of crypt-analysis.

More particularly, the addressee is provided in advance with a set of symbol functions $Y_i \ldots Y_n = Y_i(X)$, where X is a random value, and each $Y_i$ corresponds to a particular initial symbol of message. If the supplemental function were employed, then the addressee also is provided with supplemental functions $U_i = U_i(Z)$, where Z is a random value, and with a key function $W_i = W_i(Y_i, U_i)$, where $Y_i$ and $U_i$ are variable values taking any of the values of the functions $Y_i$ and $U_i$. When processing the transferred information for each initial symbol there are generated two random values X and Z. A corresponding value of $Y_i$ for each initial symbol is calculated with the function $Y_i(X)$.

The value of $U_i$ is calculated with the supplemental function $U_i(Z)$. The value of $W_i$ for this initial symbol is calculated with the key function $W_i(Y_i, U_i)$ and with the symbol value of $Y_i$ and with the supplemental value $U_i$ from the supplemental function. The addressee is transferred the information comprising data for generating random values X, $U_i$ and values of $W_i$ for each initial symbol of the set of initial symbols. For speeding up the process of decoding of a communication received by an addressee, there may be used an additional technical operation, during which the first data base of symbols are arranged or prepared in advance.

The claimed invention has a method for identifying a plurality of codes of symbols of the randomised information with a plurality of elemental symbols in the set of initial symbols. The type of the proper randomiser depends upon the type of realization of this method. The structural interpretation of the disclosed invention may be considered using the example of the claimed apparatus.

Systems with full randomisation have unusual features: (1) For one and the same keys of one and the same set of initial symbols, the set of encoded symbols for same keys is each time a random set of encoded symbols, and not identical or correlated; (2) The power of a plurality of sets of encoded symbols for one and the same set of initial symbols with the power of the plurality of codes L and number of letters in the text n is estimated to be an immense number: $L^n$. If L were a very large number, e.g. $L=10^9$ and n=1000 symbols, then the number of variations of the set of encoded symbols is evaluated to be number $10_{9000}$. In order to imagine this immense power, consider that the number of atoms in the Universe is estimated at $10_{90}$; (3) Keys for an addressee are transferred only once since one and the same set of encoded symbols changes by itself from transferring one to another, since the transferring set of encoded symbols changes in a random manner in case an unchangeable set of initial symbols.

This solves the problem of the closed channel in a major way. Randomiser in such a system is one more equivalent of an additional key, that is an analytical key having its digital parameters.

When a system has a randomiser with the power of plurality of codes $L_i=10^9$, then a set of initial symbols has the length of one megabyte. In an unlikely case when one specific symbol occurs $10^5$ times, then the probability of meeting a code of any symbol in the field of randomisation more than once at a very large number of trials is: $P_i=12.5$ EXP.$\{-19998000050000\}$. Within limits of calculation precision, this number is equal to zero. Codes, received after such randomisation, are statistically independent with the set of initial symbols.

Thus, systems with full randomisation of an set of initial symbols at a power of randomisation field of each symbol $L_1 =10^9$ provide at the output a statistically independent set of encoded symbols in reference to the set of initial symbols.

If one operated with the number $L_i=10^9$, then the randomiser model is a plurality of mismatching points with power $L=256*10^9$ for an extended table ASCII. A derandomiser should choose a plurality of points of the power $L_i=10^9$ and find in them the image of the code to the initial symbol.

Thus, already at the output of randomiser at meeting other conditions exists a theoretically stable code. Assume a user has a tested and certified, practically stable system (PSS). If the practically stable system did not meet the user's conditions of crypt-stability, then the user can include in series with the practically stable system a randomiser having the above characteristics. This results in two crypt-systems connected in series: a theoretically stable system and a practically stable system. Practically stable systems realized with full randomisation approaches the class of theoretically stable systems. At the output, a practically stable systems also produces a statistically independent set of encoded symbols relative to the set of initial symbols. Thus, because of the characteristics of the randomiser, the complete encoder system becomes a theoretically stable one.

A further characteristic feature of the claimed method is that the first data base 12 of symbols is subjected to arranging in advance. This feature allows a substantial increase in the speed of authorized decoding of the set of encoded symbols.

The structure of the claimed arrangement may be realized in different variants, carrying out the claimed method for crypt-graphical protection of information using known hardware. All these variants extend technical availabilities of the invention.

The present invention overcomes drawbacks of the known methods for crypt-graphical protection of information, thereby providing statistical dependence of an set of initial symbols and an set of encoded symbols. The present invention leads to impossibility of an unauthorized reading of the set of encoded symbols and eliminates the necessity of frequently changing keys.

The disclosed characteristic features of the claimed invention, as compared with the technical solutions known from the prior art, permits creating a device for encoding information, which provides statistical independence of the set of encoded symbols and the set of initial symbols. This statistical independence is a feature of a theoretically stable system of cryptography.

For decoding, the addressee in advance is provided with a key to the received set of encoded symbols. The key includes information on regularities corresponding to values of the transferred communication with the specific symbols of the set of initial symbols for the whole first data base 12 of symbols for the type of information. W$_i$th the key, the addressee is provided in advance with a set of functions $Y_i \ldots Y_n = Y_i(X)$, where X is a variable value, and each $Y_i$ corresponds to a specific symbol of information, and with a supplemental function $U_i = U_i(Z)$, where Z is a variable value, and with a key function $W_i = W_i(Y_i, U_i)$, where $Y_i$ and $U_i$ are variable values, taking values of any of the values of the functions $Y_i$ and $U_i$.

For encoding, for processing the transferred information, i.e., set of encoded symbols, the initial combination enters the pseudo-random number generator 25 and the encryptor 16, the signal from each identified symbol is transmitted to the first data base 12 of symbols. For each symbol of the input information two random values X and Z are generated, arriving at the first output and the second output of the pseudo-random number generator 25. W$_i$th the signal entering the data base 12 of symbols, according to the corresponding function $Y_i(x)$, the symbol unit 14 is loaded with a mathematical regularity for a specific symbol. The corresponding value of $Y_i$ is calculated in accordance with this regularity and with the value of the random value arriving at the other input into the symbol unit 14 from the first output from pseudo-random number generator 25.

The value of $U_i$ additionally is calculated according to the other number, arriving from the second output of the pseudo-random number generator 25 to the input of the first unit 18 for calculating of the supplemental function $U_i(Z)$.

The value of $W_i$ for this symbol is calculated according to the value of $Y_i$ obtained for the symbol at the output of the symbol unit 14 and the value $U_i$, obtained at the output from the first unit 18 for calculating the supplemental function by supplying the signals from the outputs of the symbol unit 14 and the first unit 18 to the first and the second input unit for calculating the key function $W_i(Y_i, Z)$. The obtained value of $W_i$ is supplied to the encryptor 16. For each symbol from the set of initial symbols loaded into the input 11, and for each symbol from the data base 12 symbols, there is matched a value of $W_i$, arriving from the output of the second unit 19 for calculating the key function to the encryptor 16. The thus obtained information is supplied to the output 17. The addressee is transferred the communication, comprising the thus obtained values of $W_i$ for each initial symbol of information and the initial combination for generation of random values of X and Z.

Having received the encoded communication, the addressee under initial combination generates numbers of X and Z for each symbol of the encoded information. The value of $U_i$ is calculated with the value of Z and the supplemental function $U_i(Z)$—one of the variable key function $W_i(Y_i, U_i)$. Using the method of sorting out the functions $Y_i(X)$, substituting into them the obtained value of X and calculating the corresponding values of $Y_i$, determines $W_i$ by calculating with variable $Y_1$ and $U_i$, to which namely function of $Y_i(X)$ corresponds the value of $W_i$ of the received communication, recovering thereby symbols of the set of initial symbols.

If the number of symbols of the set of initial symbols were 256, the number of sorts is finite and is easily realized by the modern processor technique. To reduce the time of decoding of a communication a first data base 12 of symbols may be arranged in advance using one or the other method, thus allowing to reduce the sorting out of functions and speed up the decoding. With this all advantages of the claimed method of encoding are preserved.

Using the possibilities of modern processor techniques and transferring the signals produced by the functional elements of these technique in accordance with the claimed method, the claimed apparatus provides theoretical stability of the crypt-system, i.e. The statistical independence of the set of encoded symbols from the original one with a specified probability as big as required. The apparatus uses a known element data base, which unconditionally makes such a system competitive with the most modern cryptgraphical systems.

It will be apparent to those skilled in the art that various modifications can be made to the method and apparatus for encoding and decoding information of the instant invention without departing from the scope or spirit of the invention, and it is intended that the present invention cover modifications and variations of the method and apparatus for encoding and decoding information provided they come within the scope of the appended claims and their equivalents.

We claim:

1. A method, using an apparatus for encoding a set of initial symbols from a plurality of elemental symbols, comprising the steps of:

generating, for each symbol, a first parameter representing a number of intervals of a numeric axis;

generating, for each symbol, a plurality of second parameters representing a plurality of lengths of intervals of the numeric axis;

generating, for each symbol, a plurality of third parameters representing a plurality of locations, respectively;

generating, for each symbol from the first parameter, from the second plurality of parameters, and from the third plurality of parameters, a key function for each symbol, respectively;

transforming, for each symbol using the respective key function, the set of initial symbols to a plurality of key symbols, respectively; and encoding, using the plurality of key symbols as a key, the set of initial symbols as a set of encoded symbols, respectively.

2. The method as set forth in claim 1, wherein the step of transforming includes the step of transforming, starting from an initial value for each symbol using the respective key function, the set of initial symbols to a plurality of key symbols, respectively.

3. The method as set forth in claim 1 or 2, wherein the step of generating a plurality of third parameters representing a plurality of locations includes the step of generating a plurality of third parameters representing a plurality of points, respectively.

4. The method as set forth in claim 1 or 2, wherein the step of generating a plurality of third parameters representing a plurality of locations includes the step of generating a plurality of third parameters representing a plurality of gradients, respectively.

5. The method as set forth in claim 1 or 2, wherein the step of generating a plurality of third parameters representing a plurality of locations includes the step of generating a plurality of third parameters representing a plurality of functions, respectively.

6. A method for encoding a set of initial symbols from an alphabet of symbols, comprising the steps of:

generating, for each symbol from the set of initial symbols, a first parameter representing a number of intervals of a numeric axis;

generating, for each symbol from the set of initial symbols, a plurality of second parameters representing a plurality of lengths of intervals of the numeric axis;

generating, for each symbol from the set of initial symbols, a plurality of third parameters representing a plurality of locations, respectively;

generating, for each symbol from the set of initial symbols, from the first parameter, from the second plurality of parameters, and from the third plurality of parameters, a key function for each symbol, respectively;

transforming, for each symbol using the respective key function, the set of initial symbols to a plurality of individual symbols, respectively;

generating, with a supplemental function, for each symbol, a supplemental symbol;

combining a supplemental symbol with a respective individual symbol to generate a key symbol; and encoding, using the plurality of key symbols as a key, the set of initial symbols as a set of encoded symbols, respectively.

7. The method as set forth in claim 6, wherein the step of transforming includes the step of transforming, starting from an initial value for each symbol using the respective key function, the set of initial symbols to a plurality of key symbols, respectively.

8. The method as set forth in claim 6 or 7, wherein the step of generating a plurality of third parameters representing a plurality of locations includes the step of generating a plurality of third parameters representing a plurality of points, respectively.

9. A method for decoding a set of encoded symbols, comprising the steps of:

generating, for each symbol, a first parameter representing a number of intervals of a numeric axis;

generating, for each symbol, a plurality of second parameters representing a plurality of lengths of intervals of the numeric axis;

generating, for each symbol, a plurality of third parameters representing a plurality of locations, respectively;

generating, for each symbol from the first parameter, from the second plurality of parameters, and from the third plurality of parameters, a key function for each symbol, respectively;

transforming, starting from an initial value generated during encoding the set of encoded symbols, using the symbol unit for each encoded symbol using the respective key function, the set of encoded symbols to a plurality of key symbols, respectively; and decoding, using the plurality of key symbols as a key, the set of encoded symbols as a set of initial symbols, respectively.

10. The method as set forth in claim 9, wherein the step of generating a plurality of third parameters representing a plurality of locations includes the step of generating a plurality of third parameters representing a plurality of points, respectively.

11. The method as set forth in claim 9, wherein the step of generating a plurality of third parameters representing a plurality of locations includes the step of generating a plurality of third parameters representing a plurality of gradients, respectively.

12. The method as set forth in claim 9, wherein the step of generating a plurality of third parameters representing a plurality of locations includes the step of generating a plurality of third parameters representing a plurality of functions, respectively.

13. A method for decoding a second unit transformed from a set of initial symbols from a plurality of elemental symbols, comprising the steps of:

generating, for each symbol, a first parameter representing a number of intervals of a numeric axis;

generating, for each symbol, a plurality of second parameters representing a plurality of lengths of intervals of the numeric axis;

generating, for each symbol, a plurality of third parameters representing a plurality of locations, respectively;

generating, for each symbol from the first parameter, from the second plurality of parameters, and from the third plurality of parameters, a key function for each symbol, respectively;

transforming, starting from an initial value generated during encoding the set of encoded symbols, for each encoded symbol using the respective key function, the encoded set to a plurality of individual symbols, respectively;

generating, with a supplemental function, for each encoded symbol, a supplemental symbol;

combining, using the symbol unit, a supplemental symbol with a respective individual symbol generated during encoding the set of encoded symbols, to generate a key symbol; and decoding, using the plurality of key symbols as a key, the set of encoded symbols as a set of initial symbols, respectively.

14. The method as set forth in claim 13, wherein the step of generating a plurality of third parameters representing a plurality of locations includes the step of generating a plurality of third parameters representing a plurality of points, respectively.

15. The method as set forth in claim 13, wherein the step of generating a plurality of third parameters representing a plurality of locations includes the step of generating a plurality of third parameters representing a plurality of gradients, respectively.

16. The method as set forth in claim 13, wherein the step of generating a plurality of third parameters representing a plurality of locations includes the step of generating a plurality of third parameters representing a plurality of functions, respectively.

17. A method for encoding an set of initial symbols from a plurality of elemental symbols, comprising the steps of:

initially generating at least one set functions of keys for each symbol from the set of initial symbols;

initially generating at least one set of supplemental functions of keys;

generating sequences of variable parameters for processing symbols of the set of initial symbols to a sequence of sequences of key and supplemental functions;

transforming the sequence of sequences of key and supplemental functions in sequences of the set of encoded symbols;

whereby generating sequences of parameters of variables executes on a set of functions of, dynamic key having initial sequences.

18. The method as set forth in claim 17 further including the step of preliminary generating a set of functions of keys for each symbol from the set of initial symbols in the following sequence.

* * * * *